UNITED STATES PATENT OFFICE.

AUGUSTIN J. DESPINOY, OF LILLE, FRANCE.

IMPROVEMENT IN PREPARATION OF MEDICINAL EXTRACTS.

Specification forming part of Letters Patent No. 30,050, dated September 18, 1860.

*To all whom it may concern:*

Be it known that I, AUGUSTIN JOSEPH DESPINOY, of the city of Lille, in the Empire of France, have discovered a new and useful substance and the mode of producing the same; and I hereby declare that the following is a clear, full, and exact description of the same.

The object of this my invention or discovery is the production of a concentrated extract from the liver of fishes living in sea or salt-water.

The liver of the codfish, squalus, thornback, ray, or any other kind of fish which is or may be used for the purpose of extracting therefrom oils on account of their medicinal and chemical properties, contains not only oil, but also a solid substance which forms its parenchyma. In all processes heretofore practiced for the extraction of the oil from the liver these two substances accompanying the oil have been left as a residue and thrown away or else used as a manure. My invention is based upon the discovery that this residue contains a considerable proportion of those chemical elements which impart to the oil its precious qualities, and I have succeeded in extracting and obtaining from the residue a new substance, which contains to a great extent all the medicamental and active principles of the oil.

I prepare the extract in the following manner: I first carefully separate the liquid substance from the solid residue. This I effect either by decantation or otherwise. I then take the liquid mass and evaporate it until it acquires the consistency of tough paste. This may be done directly over a fire, hot-water bath, or by causing steam or hot water to circulate through a worm placed inside the boiler or vessel. The evaporation may be carried on in the open air or under the actuating influence of a vacuum. In this way I obtain from ten to twelve pounds of the paste for every hundred pounds of the liquid. At the commencement of the operation the albumina contained in the liquid is coagulated and floats in the water in snow-like scum, which is removed from time to time. Its presence, however, in the fat causes no serious inconvenience. The paste thus extracted from the liquid of cod-liver is of a fallow color, and has the odor and taste of cod-liver oil; but it contains a greater proportion of those chemical elements which give it the well-known medicinal properties. The consistency of this paste allows of its being fashioned into pills, pastiles, or cakes, and may thus be taken by the sick and others with greater facility. This paste may be preserved without injuring its qualities even when exposed to the open air.

Having thus fully described my invention or discovery, what I claim as new and useful is—

The new substance produced substantially in the manner hereinbefore described, the same being extracted from the mother-liquid of the liver of sea-fish.

In testimony whereof I have signed my name to this specification before two subscribing witnesses.

A. J. DESPINOY.

Witnesses:
L. NOSTEN.
C. C. J. GUFFROY.